(12) United States Patent
Wang et al.

(10) Patent No.: US 11,586,304 B2
(45) Date of Patent: Feb. 21, 2023

(54) DIGITAL-POINTER INTERACTION SYSTEM AND METHOD OF DIGITAL-POINTER INTERACTION

(71) Applicant: Acer Incorporated, New Taipei (TW)

(72) Inventors: Chun-Wen Wang, New Taipei (TW); Shu-Kuo Kao, New Taipei (TW); Chao-Kuang Yang, New Taipei (TW); Chien-Shan Wang, New Taipei (TW); Shu-Wei Yeh, New Taipei (TW); Chi-Hsiu Kao, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 17/499,163

(22) Filed: Oct. 12, 2021

(65) Prior Publication Data
US 2022/0155883 A1 May 19, 2022

(30) Foreign Application Priority Data
Nov. 18, 2020 (TW) .................................. 109140302

(51) Int. Cl.
*G06F 3/038* (2013.01)
*G06F 3/04812* (2022.01)
*H04W 4/80* (2018.01)

(52) U.S. Cl.
CPC ........ *G06F 3/0383* (2013.01); *G06F 3/04812* (2013.01); *H04W 4/80* (2018.02); *G06F 2203/0384* (2013.01)

(58) Field of Classification Search
CPC ...... G06F 3/03543; G06F 3/033; G06F 3/038; G06F 3/0383; G06F 3/04812;
(Continued)

(56) References Cited

U.S. PATENT DOCUMENTS

2003/0006961 A1* 1/2003 Shipilevsky ............ G06F 3/038
345/157
2007/0094618 A1* 4/2007 Yoshida ................ G06F 3/0481
345/157
(Continued)

FOREIGN PATENT DOCUMENTS

CN 101135941 A 3/2008
TW 533372 B 5/2003
(Continued)

OTHER PUBLICATIONS

Chinese language office action dated Dec. 17, 2021, issued in application No. TW 109140302.

*Primary Examiner* — Koosha Sharifi-Tafreshi
(74) *Attorney, Agent, or Firm* — McClure, Qualey & Rodack, LLP

(57) ABSTRACT

A digital-pointer interaction system is provided, which includes a display apparatus, a host, a wireless receiving device, and a plurality of wireless pointer devices. The host plays a display screen on the display apparatus, and executes a digital-pointer application. The digital-pointer application renders a plurality of pointer cursors on the display screen according to a number of wireless pointer devices connected to the wireless receiving device, and each wireless pointer device corresponds to each pointer cursor. Each wireless pointer device periodically emits an indication signal to the wireless receiving device, and the wireless receiving device transmits the indication signal to the host. The indication signal includes displacement information of each wireless pointer device. The digital-pointer application controls movement of each pointer cursor on the display screen according to the displacement information of each wireless pointer device.

18 Claims, 5 Drawing Sheets

(58) Field of Classification Search
CPC ..... G06F 2203/0384; G06F 2203/0382; G06F 3/0346
USPC .......................... 345/157, 163; 715/754, 856
See application file for complete search history.

(56) References Cited

U.S. PATENT DOCUMENTS

| | | | |
|---|---|---|---|
| 2009/0309830 A1* | 12/2009 | Yamamoto | G06F 3/04845 345/156 |
| 2013/0091583 A1* | 4/2013 | Karroumi | G06F 21/604 726/26 |
| 2014/0168079 A1* | 6/2014 | Huang | G06F 3/0383 345/158 |
| 2016/0154478 A1* | 6/2016 | Choi | G06F 3/03542 345/158 |
| 2019/0060742 A1* | 2/2019 | Moon | G06F 3/011 |

FOREIGN PATENT DOCUMENTS

| | | |
|---|---|---|
| TW | 200500966 A | 1/2005 |
| TW | 202016697 A | 5/2020 |

* cited by examiner

DIGITAL-POINTER INTERACTION SYSTEM AND METHOD OF DIGITAL-POINTER INTERACTION

CROSS REFERENCE TO RELATED APPLICATIONS

This application claims priority of Taiwan Patent Application No. 109140302, filed on Nov. 18, 2020, the entirety of which is incorporated by reference herein.

BACKGROUND OF THE INVENTION

Field of the Invention

The present invention relates to a pointer apparatus, and, in particular, to a digital-pointer interaction system and a method of digital-pointer interaction.

Description of the Related Art

In order to give a successful presentation, a presenter must provide rich content and catchy slogans. In addition to this, the presentation can be improved with the aid of excellent presentation tools. The briefing pointer is a useful briefing tool, as it can point out a part of the text or picture in a slide, so that the audience and presenter can focus on this part. However, existing briefing pointers only provide a one-to-one solution, insofar as only the presenter holds the briefing pointer. When a member of the audience asks questions, the audience member does not have a laser pointer with which to interact with the presenter. If a traditional laser pointer is used for presentation or interaction, the traditional laser pointer needs to emit laser light and present a light spot on the projection screen. If a TV screen or computer monitor with high brightness is used in the meeting room, a traditional laser pointer cannot present a light spot on the TV screen or computer monitor, so it can only be used on the projection screen of a projector, and its color selection is minimal, usually restricted to only red and green.

Therefore, there is need for a digital-pointer interaction system and a method of digital-pointer interaction to solve the above problem.

BRIEF SUMMARY OF THE INVENTION

In an exemplary embodiment, a digital-pointer interaction system is provided, which includes a display apparatus, a host, a wireless receiving device, and a plurality of wireless pointer devices. The host is configured to play a display screen on the display apparatus, and execute a digital-pointer application. The digital-pointer application renders a plurality of pointer cursors on the display screen according to a number of wireless pointer devices connected to the wireless receiving device, and each wireless pointer device corresponds to each pointer cursor. Each wireless pointer device periodically emits an indication signal to the wireless receiving device, and the wireless receiving device transmits the indication signal to the host. The indication signal comprises displacement information of each wireless pointer device. The digital-pointer application controls movement of each pointer cursor on the display screen according to the displacement information of each wireless pointer device.

In some embodiments, the wireless receiving device and the wireless pointer devices are connected using the BLE (Bluetooth Low Energy) protocol, and the wireless receiving device declares the wireless pointer devices as a plurality of BLE beacons.

In some embodiments, in response to the wireless receiving device determining that a device identifier of a specific wireless pointer device is the same as a predetermined device identifier, the wireless receiving device automatically builds a BLE connection to the specific wireless pointer device.

In some embodiments, a connection interval set by each wireless pointer device is the same, and the wireless receiving device sets its scanning interval to be equal to the connection interval set by each wireless pointer device.

In some embodiments, the scanning interval is greater than the number multiplied by a duration of the connection event of each wireless pointer device plus a time period of a scanning window of the wireless receiving device.

In some embodiments, in each scanning interval, each wireless pointer device sends corresponding connection events to the wireless receiving device in sequence, and the wireless receiving device waits for a time obtained by multiplying the number with the duration of the connection event of each wireless pointer device before performing a scan operation of the scanning window to detect whether other wireless pointer devices are added to the digital-pointer interaction system.

In some embodiments, each wireless pointer device comprises a wireless emitter and a motion sensor, and the motion sensor detects acceleration and angular speed of each wireless pointer device, and the displacement information of each wireless pointer device comprises the acceleration and angular speed of each wireless pointer device.

In some embodiments, the digital-pointer application executed by the host calculates displacement of each pointer cursor according to the acceleration and angular speed in the displacement information of each wireless pointer device, and control movement of each pointer cursor according to the displacement of each pointer cursor.

In some embodiments, each point cursor is different from a cursor of an operating system executed by the host. In some other embodiments, one of the pointer cursors is a cursor of an operating system executed by the host, and other pointer cursors are different than a cursor of the operating system.

In another exemplary embodiment, a method of digital-pointer interaction, for use in a digital-pointer interaction system is provided. The digital-pointer interaction system includes a display apparatus, a host, a wireless receiving device, and a plurality of wireless pointer devices. The wireless receiving device is electrically connected to the host, and the host plays a display screen on the display apparatus. The method includes the following steps: connecting the wireless pointer devices to the wireless receiving device; utilizing the host to render a plurality of pointer cursors on the display screen according to a number of wireless pointer devices connected to the wireless receiving device, wherein each wireless pointer device corresponds to each pointer cursor; utilizing each wireless pointer device to periodically emit an indication signal to the wireless receiving device, wherein the indication signal comprises displacement information of each wireless pointer device; utilizing the wireless receiving device to transmit the indication signal to the host; and utilizing the host to control movement of each pointer cursor according to the displacement information of each wireless pointer device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

It must be understood that the words "including", "including" and other words used in this specification are used to indicate the existence of specific technical features, values, method steps, operations, elements and/or components, but not It is not excluded that more technical features, values, method steps, job processing, elements, components, or any combination of the above can be added.

Words such as "first", "second", and "third" used in the claims are used to modify the elements in the claims, and are not used to indicate that there is an order of priority, antecedent relationship, or It is an element that precedes another element, or the chronological order of execution of method steps, which is only used to distinguish elements with the same name.

Figure 1:
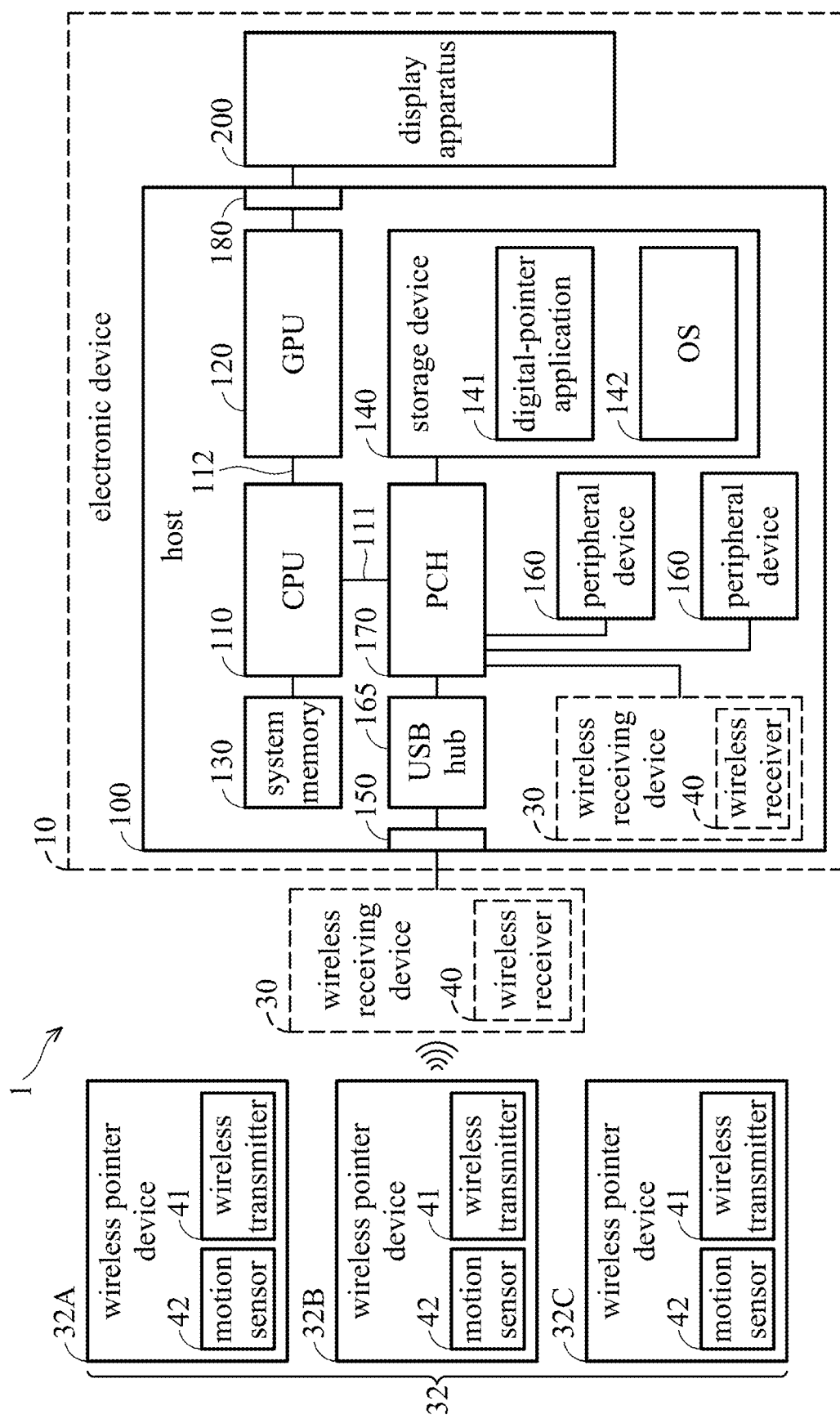
FIG. 1 is a block diagram of a digital-pointer interaction system in accordance with an embodiment of the invention.

FIG. 1 is a block diagram of a digital-pointer interaction system in accordance with an embodiment of the invention.

In an embodiment, the digital-pointer interaction system 1 may include a host 100, a display apparatus 200, a wireless receiving device 30, one or more wireless pointer devices 32A-32C. The host 100 and the display apparatus 200 can be regarded as an electronic device 10 equipped with a display apparatus, such as a personal computer, a laptop computer, a server, or a smart TV. The display apparatus 200 may be a liquid-crystal display (LCD), a computer monitor, an electronic billboard, a television, or any other apparatus capable of displaying images.

The host 100, for example, may include a central processing unit (CPU) 110, a graphics processing unit (GPU) 120, a system memory 130, a storage device 140, one or more peripheral devices 160, a Universal Serial Bus (USB) hub 165, and a platform controller hub (PCH) 170. The CPU 110 has a direct electrical connection to the system memory 130, and can be connected to the GPU 120 though a bus 112.

The CPU 110 can also be connected to the PCH 170 though a bus 11, which may be a direct-media interface (DMI) bus. The PCH 170 can be connected to other devices having lower access speeds, such as the storage device 140, USB hub 165, and peripheral devices 160.

The GPU 120 may be a GPU disposed on a video card, or a GPU that is integrated to the CPU 110. The display apparatus 200 may be a flat display, television, projector, or a computer monitor, but the invention is not limited thereto. The GPU 120 may perform graphics processing of the digital-pointer application 141 executed by the CPU 110 to generate an image signal including one or more images, and transmit the image signal to the display apparatus 200 through the transmission interface 180. The transmission interface 180 may include a wired transmission interface and/or a wireless transmission interface, wherein the wired transmission interface may include an HDMI (High Definition Multimedia Interface) interface, a DP (DisplayPort) interface, an eDP (embedded DisplayPort) interface, an LVDS (low voltage differential signaling) interface, a USB interface, a USB Type-C interface, a Thunderbolt interface, a DVI (digital video interface) interface, a VGA (video graphics array) interface, a GPIO (general-purpose input/output) interface, a UART (universal asynchronous receiver transmitter) interface, a SPI (serial peripheral interface) interface, an I2C (inter-integrated circuit) interface, or a combination thereof. The wireless transmission interface may include Bluetooth, Wi-Fi, NFC (near-field communication) interfaces, but the invention is not limited thereto. When the electronic device 10 is a laptop computer, the transmission interface 180 may be an eDP interface.

The system memory 130 may be a random access memory, such as a dynamic random access memory or a static random access memory, but the invention is not limited thereto. The storage device 140 may be a non-volatile memory, such as a hard-disk drive (HDD), a solid-state disk (SSD), a flash memory, or a read-only memory (ROM), but the invention is not limited thereto.

For example, the storage device 140 may store a digital-pointer application 141 and an operating system 142 (e.g., Windows, Linux, MacOS, etc.), and the CPU 110 may load the digital-pointer application 141 and the operating system 142 into the system memory 130 for execution. The peripheral apparatus 160, for example, may include input apparatuses such as a keyboard, mouse, touchpad, etc., but the invention is not limited thereto.

In some embodiments, when the electronic device 10 itself is not equipped with the wireless receiving device 30, the wireless receiving device 30 may include a USB interface (not shown) that can be inserted into the USB interface 150 of the host 100. In some other embodiments, the electronic device 10 may be equipped with the wireless receiving device 30, as depicted in FIG. 1.

The wireless pointer devices 32A-32C can be collectively referred to as wireless pointer devices 32. The wireless receiver 40 of the wireless receiving device 30 and the wireless emitter 41 of the wireless pointer devices 32A-32C may support wireless transmission standards such as the Bluetooth 4.0 standard or above, Bluetooth Low Energy (BLE) 4.0 or above, or Wi-Fi, but the invention is not limited thereto. For ease of description, in the following embodiments, the BLE standard is used for wireless transmission. It should be noted that three wireless pointer devices 32A-32C are for illustrative purposes, but the invention is not limited to the three wireless pointer devices 32A-32C, and one or more wireless pointer devices can be used according to practical needs.

When the wireless receiving device 30 are paired with the wireless pointer devices 32A-32C to build BLE connections, each of the wireless pointer devices 32A-32C can emit a respective indication signal to the wireless receiving device 30. Because each of the wireless pointer devices 32A-32C has a respective device identifier and MAC (media access control) address, the CPU 110 (or the wireless receiving device 30) may declare the wireless pointer devices 32A-32C as different BLE beacons or human interface devices (HIDs). When the wireless receiving device 30 has received different indication signals from the wireless pointer devices 32A-32C, the wireless receiving device 30 may transmit the indication signals to the CPU 110 through the USB hub 265 and PCH 270.

Specifically, each of the wireless pointer devices 32A-32C may include a wireless emitter 41 and a motion sensor 42, wherein the wireless emitter 41 may support the wireless transmission standards such as Bluetooth 4.0 or above, BLE 4.0 or above, or Wi-Fi. The motion sensor 42, for example, may include an accelerometer, a gyroscope, and a gesture sensor that are capable of detecting displacement information of the wireless pointer device 32, where the displacement information may include the acceleration and angular speed of the wireless pointer device 32.

The digital-pointer application 141 executed by the CPU 110 may render one or more pointer cursors on the desktop screen of the host 100, and the pointer cursors have different colors, so as to facilitate the identification of different users. In some embodiments, the aforementioned pointer cursors are different from the cursor of the operating system 142. In some other embodiments, one of the aforementioned pointer cursors may be the cursor of the operating system 142.

Because each pointer cursor corresponds to one of the wireless pointer device 32, when the user operates one of the wireless pointer devices 32A-32C, the CPU 110 can recognize the indication signal corresponding to the operated wireless pointer device 32, and calculate the displacement of the pointer cursor on the display screen according to the displacement information of the indication signal. The CPU 110 can control the corresponding pointer cursor to move according to the displacement. It should be noted that each of the wireless pointing devices 32A-32C can be operated independently, and the movement of the pointer cursors do not conflict with each other.

Figure 2A:
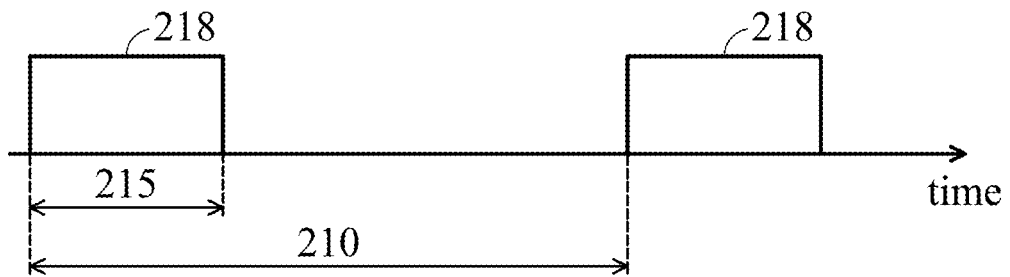
FIG. 2A is a diagram of scanning intervals and the scanning window in accordance with an embodiment of the invention.
Figure 2B:
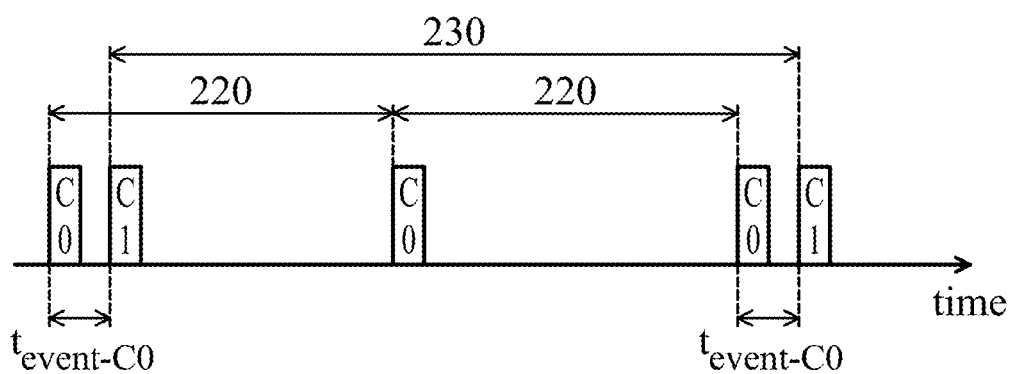
FIG. 2B is a diagram of connection intervals and connection events in accordance with an embodiment of the invention.

FIG. 2A is a diagram of scanning intervals and the scanning window in accordance with an embodiment of the invention. FIG. 2B is a diagram of connection intervals and connection events in accordance with an embodiment of the invention.

Please refer to FIG. 1 and FIGS. 2A-2B. When using the BLE protocol to achieve one-to-many connections, the communication of the BLE protocol includes two roles: peripheral devices and a central device, wherein the wireless pointing devices 32A-32C may be the peripheral devices, and the wireless receiving device 30 may be the central device. The peripheral devices may generate (or own) data, and may constantly send out advertising packets to notify the surrounding environment of their existence, such as using the advertising channels 37, 38, and 39 of the BLE 4.0 protocol in predetermined order. The central device may repeatedly scan the surrounding environment to determine whether there are BLE peripheral devices that can be connected. Similarly, the central device will also use the advertising channels 37, 38, and 39 of the BLE protocol in another predetermined order to send a scan request, scan response, and connection request.

When a traditional Bluetooth device is connected, it must be paired manually. Because the wireless pointer system may include multiple wireless pointer devices. If manual pairing is used, multiple manual pairing procedures need to be performed, which are cumbersome and take a long time. Therefore, the digital-pointer interaction system 1 of the present application may provide a pairing-free function. For example, each of wireless pointer devices 32A-32C in the digital-pointer interaction system 1 may have the same device identifier (e.g., can be regarded as a universally unique identifier (UUID)), such as "Baton", but the invention is not limited thereto. For example, the following function can be added to firmware in each of wireless pointer device 32A-32C to declare the device identifier used during broadcast: blePeripheral.setLocalName("Baton").

In addition, the wireless receiving device 30 may set the predetermined device identifier used for scanning other BLE devices to "Baton". For example, the following function can be added to firmware in each wireless pointer device 32A-32C to declare the predetermined device identifier used during scanning BLE devices: BLE.scanForName("Baton").

Specifically, the wireless receiving device 30 may scan advertising channels 37, 38, and 39 according to a predetermined order to obtain advertising packets of a specific wireless pointer device. When the wireless receiving device 30 receives an advertising packet from a specific wireless pointer device (e.g., one of the wireless pointer devices 32A-32C), the wireless receiving device 30 will further determine whether the device identifier (or UUID) of the specific wireless pointer device contained in the advertising packet is the same as the predetermined device identifier. When the device identifier (or UUID) of the specific wireless pointer device is the same as the predetermined device identifier, the wireless receiving device 30 will automatically connect with the specific wireless pointer device, and the pairing process of the BLE protocol is exempted. After the wireless receiving device 30 establishes a connection with the specific wireless pointer device, the wireless receiving device 30 can receive the data of the specific wireless pointer device. In this embodiment, the indication signals sent by the wireless pointer devices 32A-32C to the wireless receiving device 30 include individual displacement information.

In an embodiment, the connection-related parameters of the BLE protocol may include: scan window, scan interval, connection event, and connection interval. The scan window indicates the duration for the central device to scan once, and the scan interval indicates the period of the scan. As shown in FIG. 2A, 210 denotes the scan interval, and 215 denotes the scan window. The scan operation 218 indicates that the scan is executed in the scan window 215.

The connection event indicates refers to the time it takes for the central device to communicate with the peripheral devices. The connection interval indicates the interval between two connection events between the central device and the same peripheral device. As shown in FIG. 2B, C0 represents the connection event of the first peripheral device (e.g., the wireless pointer device 32A or a preset wireless pointer device), and 220 represents the connection interval of the first peripheral device, which indicates the interval between two consecutive connection events C0. C1 represents the connection event of the second peripheral device (e.g., the wireless pointer device 32B), and 230 represent the connection interval of the second peripheral device, which indicates the interval between two consecutive connection events C1. $t_{event-C0}$ indicates the duration of the connection event C0.

It should be noted that the central device (e.g., the wireless receiving device 30) can adjust its own scanning window SW and scanning interval SI, and each peripheral device (e.g., wireless pointer devices 32A-32C) can adjust the duration of its own connection event and the connection interval CI.

In the present invention, the digital-pointer interaction system 1 may further include the functions of "multi-connection" and "scan-while-connected". For example, the connection interval CI of each of the wireless pointer devices 32A-32C is the same, and the scanning interval SI of the wireless receiving device 30 can be set to be the same as the connection interval CI of the wireless pointer devices 32A-32C.

In addition, if there are N wireless pointer devices 32 can be connected to the wireless receiving device 30 at the same time, the scanning interval and the connection interval need to be greater than (N*connection event+scanning window). Using the aforementioned settings, the wireless receiving device 30 can complete data transmission with all wireless pointer devices 32 within a scanning SI (or connection interval CI), and can also scan for new peripheral devices.

Figure 2C:
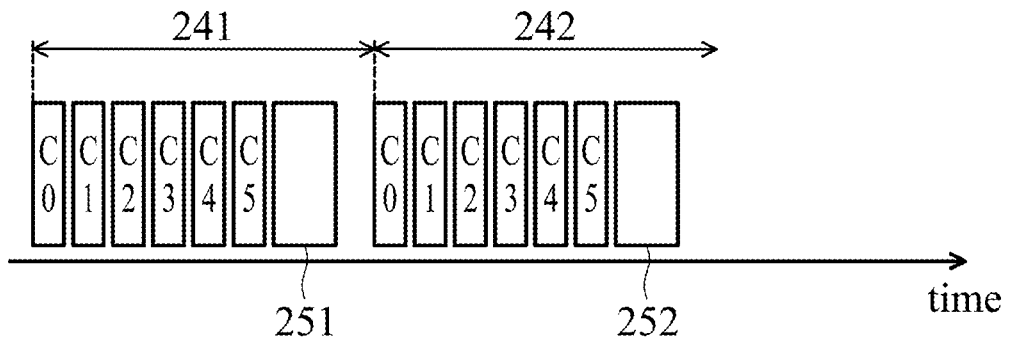
FIG. 2C is a diagram of connection intervals and scanning intervals in accordance with an embodiment of the invention.

For example, if the number of wireless pointer devices 32 that can be connected to the wireless receiving device 30 at the same time is 6 (i.e., N=6), the scanning interval SI and the connection interval CI need to be greater than (6*connection event+scanning window). As shown in FIG. 2C, because the scanning interval SI is equal to the connection interval CI, the intervals 241 and 242 can simultaneously represent the scan interval SI and the connection interval CI. If the connection events of the six wireless pointer devices are C0 to C5, respectively, the interval 241 may include the connection events C0 to C5 plus the scan window 251. Similarly, the interval 242 may include connection events C0 to C5 plus the scan window 252, and so on. The duration of scanning windows 251 and 252 are the same.

Figure 3A:
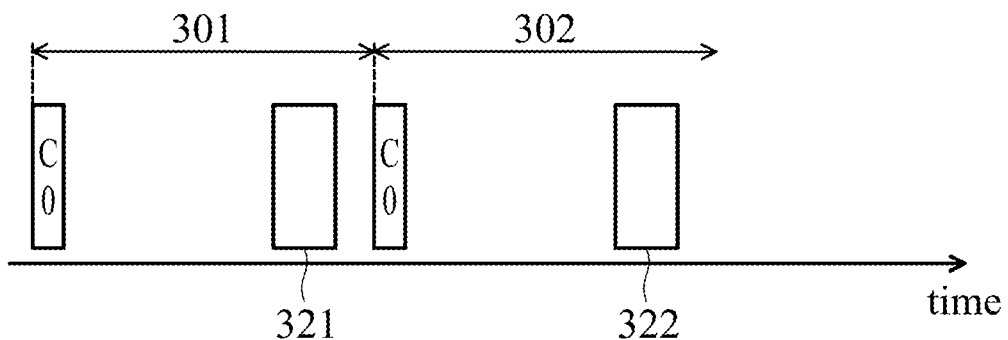
FIGS. 3A-3C are diagrams of the function of scanning-while-connected of the wireless receiving device in accordance with an embodiment of the invention.
Figure 3B:
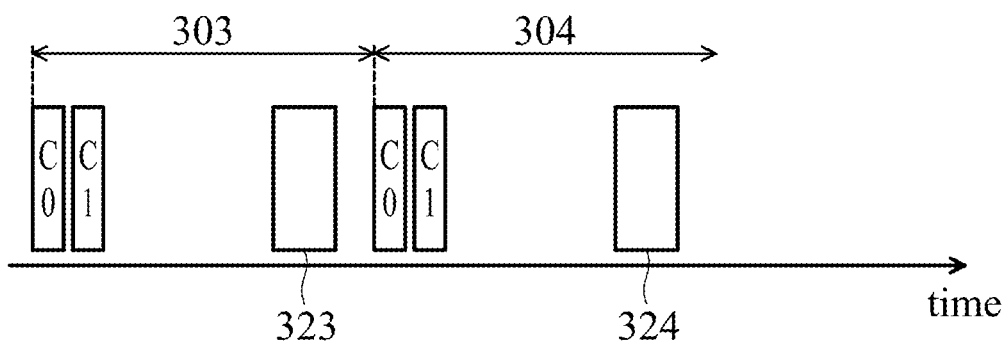
Figure 3C:
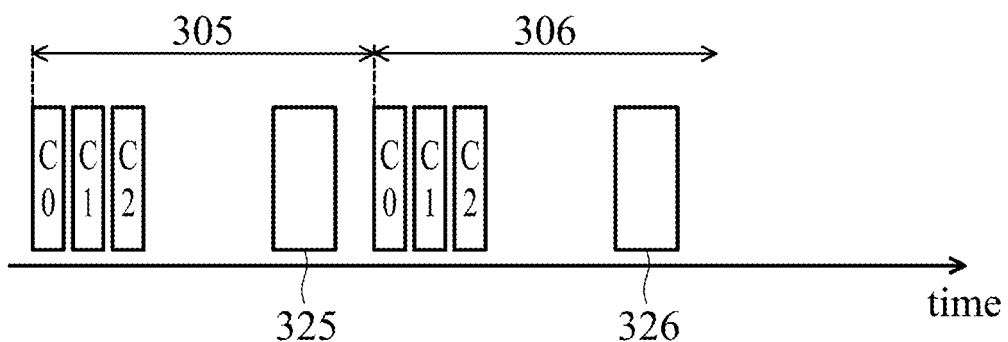

FIGS. 3A-3C are diagrams of the function of scanning-while-connected of the wireless receiving device in accordance with an embodiment of the invention.

Please refer to FIG. 1 and FIGS. 3A-3C. In the embodiment, if the number of wireless pointer devices 32 that can be connected to the wireless receiving device 30 at the same time is 6 (i.e., N=6), the scanning interval SI and the connection interval CI need to be greater than (6*connection event+scanning window).

When the digital-pointer interaction system 1 is activated, there is only one wireless pointer device 32A. The wireless receiving device 30 may set the wireless pointer device 32A as the default wireless pointer device, and the connection event of the wireless pointer device 32A is represented by C0. At this time, the wireless pointer device 32A will send the connection event C0 at a fixed interval 301 (equal to the scanning interval and the connection interval).

As depicted in FIG. 3A, in the interval 301 (equal to the scanning interval and the connection interval), after the wireless receiving device 30 receives the connection event C0 from the wireless pointer device 32A, it will wait for duration of 5 connection events before start scanning from the scanning window 321. In the interval 302 (equal to the scanning interval and the connection interval), after the wireless receiving device 30 receives the connection event C0 from the wireless pointer device 32A, it will wait for duration of 5 connection events before start scanning from the scanning window 322. However, the wireless receiving device 30 detects the advertising message of the wireless pointer device 32B in the scanning window 322, where the advertising message indicates that the wireless pointer device 32B is activated and is within the detection range of the wireless receiving device 30 (e.g., 10 to 30 meters). Meanwhile, the wireless receiving device 30 may build a connection with the wireless pointer device 32B during the scanning window 322, and can start receiving the connection events C0 and C1 of the wireless pointer devices 32A and 32B from the next connection interval, as shown in FIG. 3B.

In FIG. 3B, because the wireless receiving device 30 is connected to the wireless pointer devices 32A and 32B, in the interval 303 (equal to the scanning interval and connection interval), after the wireless receiving device 30 receives the connection events C0 and C1 respectively from the wireless pointer devices 32A and 32B, the wireless receiving device 30 will wait for duration of 4 connection events before start scanning from the scanning window 323. In the interval 304 (equal to the scanning interval and connection interval), after the wireless receiving device 30 receives the connection events C0 and C1 respectively from the wireless pointer devices 32A and 32B, the wireless receiving device 30 will wait for duration of 4 connection events before start scanning from the scanning window 324. However, the wireless receiving device 30 detects the advertising message of the wireless pointer device 32C in the scanning window 324, where the advertising message indicates that the wireless pointer device 32C is activated and is within the detection range of the wireless receiving device 30 (e.g., 10 to 30 meters). Meanwhile, the wireless receiving device 30 may build a connection with the wireless pointer device 32C during the scanning window 324, and can start receiving the connection events C0, C1, and C2 of the wireless pointer devices 32A, 32B, and 32C from the next connection interval, as shown in FIG. 3C.

In FIG. 3C, because the wireless receiving device 30 is connected to the wireless pointer devices 32A, 32B, and 32C, in the interval 305 (equal to the scanning interval and connection interval), after the wireless receiving device 30 receives the connection events C0, C1 and C2 respectively from the wireless pointer devices 32A, 32B, and 32C, the wireless receiving device 30 will wait for duration of 3 connection events before start scanning from the scanning window 325. In the interval 306 (equal to the scanning interval and connection interval), after the wireless receiving device 30 receives the connection events C0, C1, and C2 respectively from the wireless pointer devices 32A, 32B, and 32C, the wireless receiving device 30 will waits for duration of 3 connection events before start scanning from the scanning window 326, and so on. If the wireless receiving device 30 is connected to 6 wireless pointer devices 32, the timing diagram can be referred to FIG. 2C.

Figure 4:
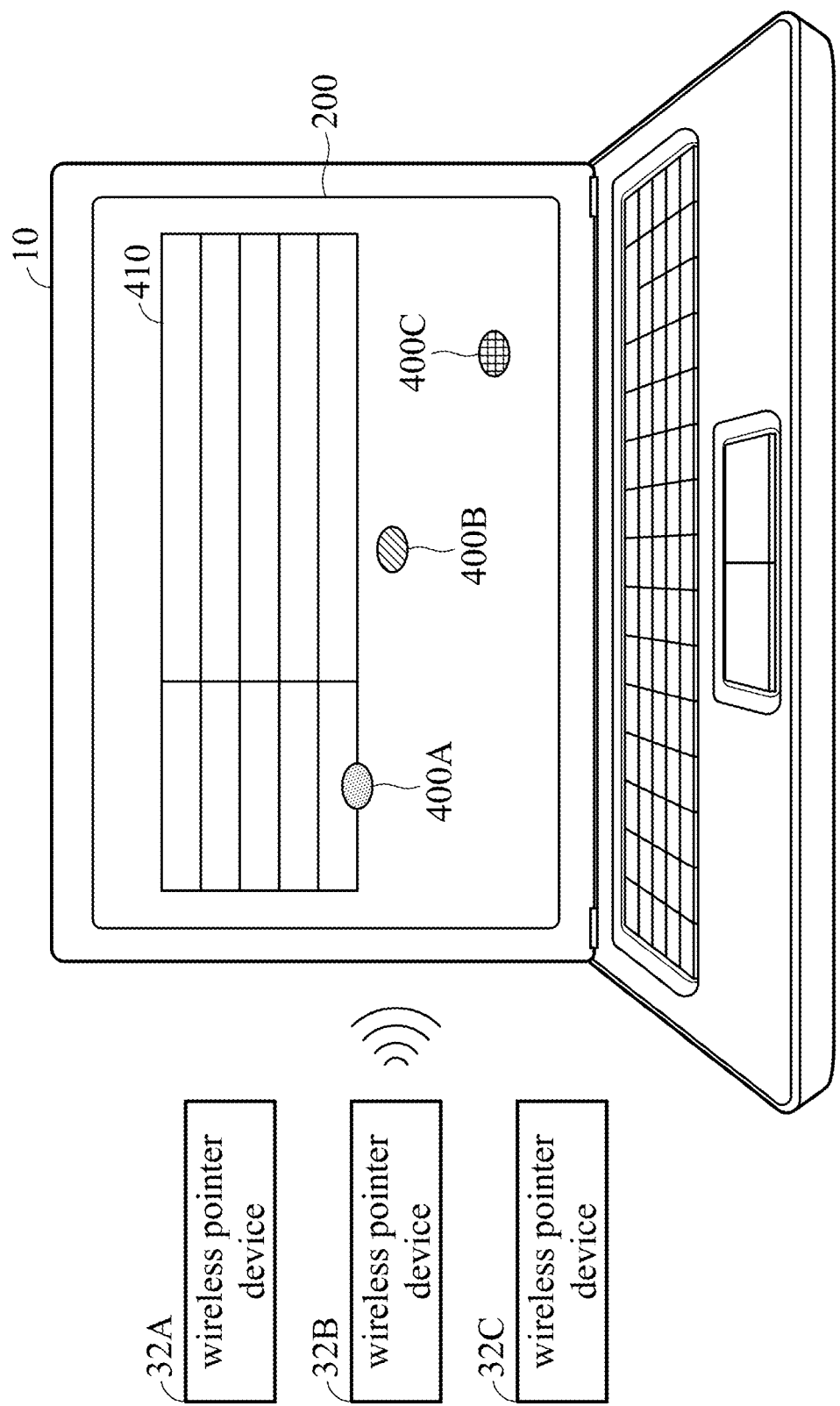
FIG. 4 is a diagram of a usage scenario of the digital-pointer interaction system in accordance with an embodiment of the invention.

FIG. 4 is a diagram of a usage scenario of the digital-pointer interaction system in accordance with an embodiment of the invention.

In an embodiment, if the electronic device 10 equipped with the wireless receiving device 30 is connected to 3 wireless pointer devices 32A, 32B, and 32C, the wireless pointer devices 32A, 32B, and 32C can periodically emit an indication signal (i.e., connection event) to transmit the displacement information thereof to the wireless receiving device 30 of the electronic device 10. The electronic device 10 may play a display screen (i.e., desktop screen) on the display apparatus 200.

Because the electronic device 10 executes the digital-pointer application 141, the digital-pointer application 141 can render the same number of pointer cursors on the display screen 410 according to the number of wireless pointer devices 32 connected to the wireless receiving device 30. In the embodiment, the number of wireless pointer devices 32 connected to the wireless receiving device 30 is 3, so the digital-pointer application 141 renders pointer cursors 400A, 400B, and 400C on the display screen 410, wherein the image layer of the pointer cursors 400A, 400B, and 400C are above the display screen 410, so the pointer cursors 400A, 400B, and 400C can cover part of the display screen j410. The movements of the pointer cursors 400A, 400B, and 400C correspond to the displacement information of the wireless pointer devices 32A, 32B, and 32C, respectively. It should be noted that different users can control the pointer cursors 400A, 400B, and 400C through the wireless pointer devices 32A, 32B, and 32C, and the movement of the pointer cursors do not conflict with each other. Accordingly, different users can control the pointer cursors on the display screen through the wireless pointer devices 32A, 32B, and 32C for interaction, respectively.

Figure 5:
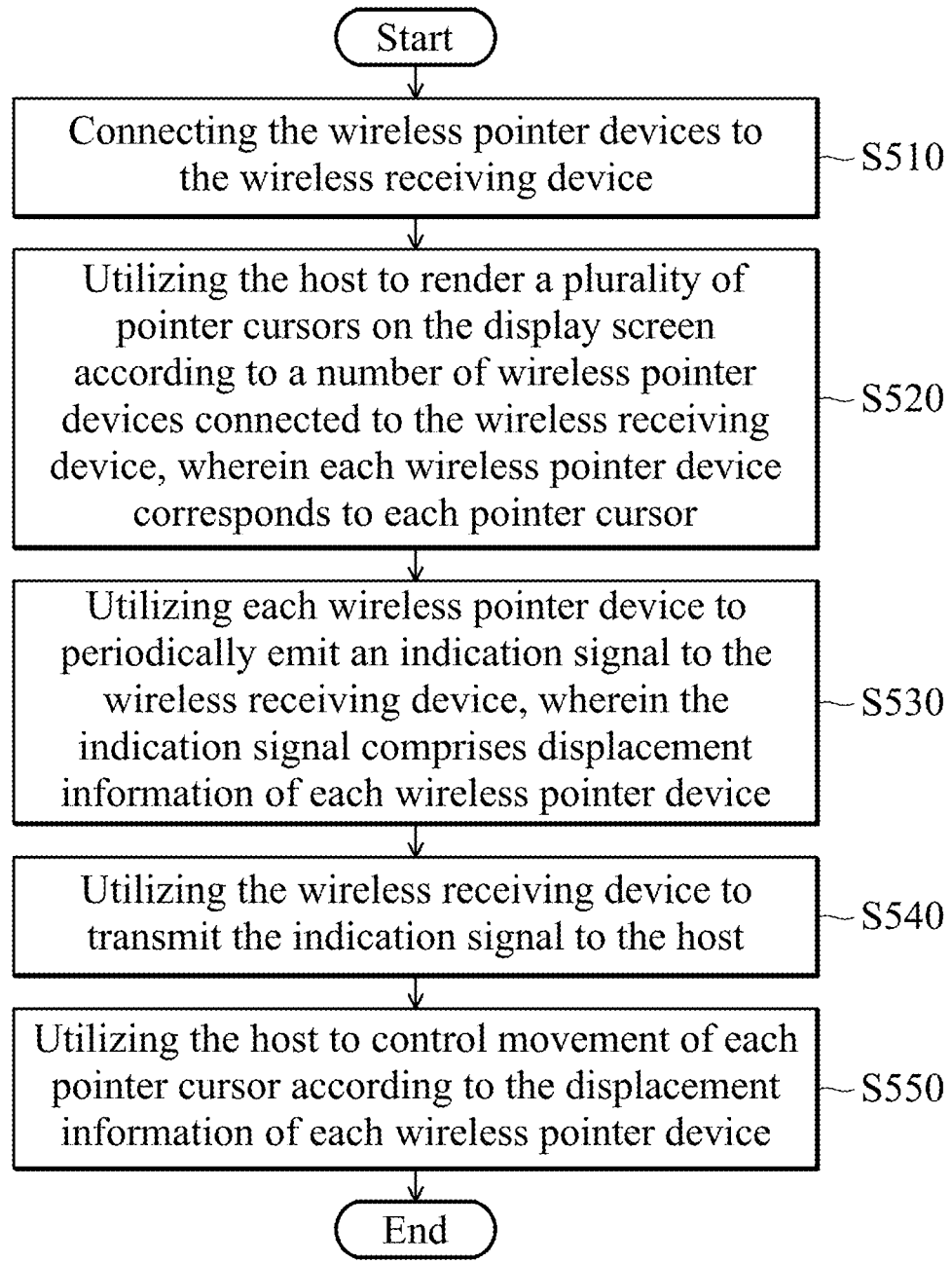
FIG. 5 is a flow chart of a method of digital-pointer interaction in accordance with an embodiment of the invention.

FIG. 5 is a flow chart of a method of digital-pointer interaction in accordance with an embodiment of the invention. Please refer to FIG. 1 and FIG. 5.

In step S510, the wireless pointer devices 32A-32C are connected to the wireless receiving device 30. For example, the wireless receiving device 30 and the wireless pointer devices 32A-32C are connected using the BLE protocol, and the wireless receiving device 30 declares the wireless pointer devices 32A-32C as a plurality of BLE beacons. In addition, the wireless receiving device 30 may set a predetermined device identifier (e.g., "Baton", but not limited) for scanning other BLE devices. In response to the wireless receiving device 30 determining that the device identifier of a specific wireless pointer device of the wireless pointer devices 32A-32C is the same as the predetermined device identifier, the wireless receiving device automatically establishes a BLE connection with the specific wireless pointer device.

In step S520, the host renders pointer cursors on the display screen according to the number of wireless pointer devices connected to the wireless receiving device, wherein each wireless pointer device corresponds to each pointer cursor. For example, the digital-pointer application 141 executed by the CPU 110 may render one or more pointer cursors on the desktop screen of the host 100, and the pointer cursors have different colors, so as to facilitate the identification of different users. In some embodiments, the aforementioned pointer cursors are different from the cursor of the operating system 142. In some other embodiments, one of the aforementioned pointer cursors may be the cursor of the operating system 142.

In step S530, each wireless pointer device periodically emits an indication signal to the wireless receiving device, wherein the indication signal includes displacement information of each wireless pointer device. For example, the indication signal emitted by each wireless pointer device may be a connection event, and the displacement information of each wireless pointer device may include acceleration and angular speed of each wireless pointer device.

In step S540, the wireless receiving device is utilized to transmit the indication signal to the host.

In step S550, the host is utilized to control movement of each pointer cursor on the display screen according to the displacement information of each wireless pointer device. For example, because each pointer cursor corresponds to one of the wireless pointer device 32, when the user operates one of the wireless pointer devices 32A-32C, the CPU 110 can recognize the indication signal corresponding to the operated wireless pointer device 32, and calculate the displacement of the pointer cursor on the display screen according to the displacement information of the indication signal. The CPU 110 can control the corresponding pointer cursor to move according to the displacement. It should be noted that each of the wireless pointing devices 32A-32C can be operated independently, and the movement of the pointer cursors do not conflict with each other.

In view of the above, a digital-pointer interaction system and a method of digital-pointer interaction are provided, which may dispose a wireless receiving device on an electronic device, and the wireless receiving device can be connected to one or more wireless pointer devices without pairing. The electronic device can execute a digital-pointer application to render the pointer cursor corresponding to each wireless pointer device on the display screen, and different users can control the corresponding pointer cursor separately using each wireless pointer device, and the movement of the pointer cursors do not conflict with each other, so as to achieve interaction. In addition, the wireless receiving device can repeatedly scan for other wireless devices in the connection state, so other wireless pointer devices can be added to the digital-pointer interaction system for interaction at any time.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A digital-pointer interaction system, comprising:
a display apparatus;
a host, configured to play a display screen on the display apparatus, and execute a digital-pointer application;
a wireless receiving device, electrically connected to the host; and
a plurality of wireless pointer devices, connected to the wireless receiving device;
wherein the digital-pointer application renders a plurality of pointer cursors on the display screen according to a number of wireless pointer devices connected to the wireless receiving device, and wireless pointer devices correspond to the pointer cursors,
wherein each wireless pointer device periodically emits an indication signal to the wireless receiving device, and the wireless receiving device transmits the indication signal to the host, wherein the indication signal comprises displacement information for each wireless pointer device,
wherein the digital-pointer application controls movement of each pointer cursor on the display screen according to the displacement information of each wireless pointer device;
wherein a connection interval set by each wireless pointer device is the same, and the wireless receiving device sets its scanning interval to be equal to the connection interval set by each wireless pointer device.

2. The digital-pointer interaction system as claimed in claim 1, wherein the wireless receiving device and the wireless pointer devices are connected using the BLE (Bluetooth Low Energy) protocol, and the wireless receiving device designates the wireless pointer devices as a plurality of BLE beacons.

3. The digital-pointer interaction system as claimed in claim 2, wherein in response to the wireless receiving device determining that a device identifier of a specific wireless pointer device in the wireless pointer devices is the same as a predetermined device identifier, the wireless receiving device automatically builds a BLE connection to the specific wireless pointer device.

4. The digital-pointer interaction system as claimed in claim 1, wherein the scanning interval is greater than the number multiplied by a duration of the connection event of each wireless pointer device plus a time period of a scanning window of the wireless receiving device.

5. The digital-pointer interaction system as claimed in claim 1, wherein in each scanning interval, each wireless pointer device sends corresponding connection events to the wireless receiving device in sequence, and the wireless receiving device waits for a time period obtained by multiplying the number with the duration of the connection event of each wireless pointer device before performing a scan operation using the scanning window to detect whether other wireless pointer devices are to be added to the digital-pointer interaction system.

6. The digital-pointer interaction system as claimed in claim 1, wherein each wireless pointer device comprises a wireless emitter and a motion sensor, and the motion sensor detects acceleration and angular speed of each wireless pointer device, and the displacement information of each wireless pointer device comprises the acceleration and angular speed of each wireless pointer device.

7. The digital-pointer interaction system as claimed in claim 1, wherein the digital-pointer application executed by the host calculates displacement of each pointer cursor according to the acceleration and angular speed in the displacement information of each wireless pointer device, and control the movement of each pointer cursor according to the displacement of each pointer cursor.

8. The digital-pointer interaction system as claimed in claim 1, wherein each pointer cursor is different from a cursor of an operating system executed by the host.

9. The digital-pointer interaction system as claimed in claim 1, wherein one of the pointer cursors is a cursor of an operating system executed by the host, and other pointer cursors are different than a cursor of the operating system.

10. A method of digital-pointer interaction, for use in a digital-pointer interaction system, wherein the digital-pointer interaction system comprises a display apparatus, a host, a wireless receiving device, and a plurality of wireless pointer devices, and the wireless receiving device is electrically connected to the host, and the host plays a display screen on the display apparatus, the method comprising:
connecting the wireless pointer devices to the wireless receiving device;
utilizing the host to render a plurality of pointer cursors on the display screen according to a number of wireless pointer devices connected to the wireless receiving device, wherein the wireless pointer devices correspond to the pointer cursors;
utilizing each wireless pointer device to periodically emit an indication signal to the wireless receiving device, wherein the indication signal comprises displacement information for each wireless pointer device;
utilizing the wireless receiving device to transmit the indication signal to the host; and
utilizing the host to control movement of each pointer cursor according to the displacement information of each wireless pointer device;
wherein a connection interval set by each wireless pointer device is the same, and the method further comprises: utilizing the wireless receiving device to set its scanning interval to be equal to the connection interval set by each wireless pointer device.

11. The method as claimed in claim 10, wherein the wireless receiving device and the wireless pointer devices are connected using the BLE (Bluetooth Low Energy) protocol, and the wireless receiving device declares the wireless pointer devices as a plurality of BLE beacons.

12. The method as claimed in claim 11, wherein the step of connecting the wireless pointer devices to the wireless receiving device comprises: in response to the wireless receiving device determining that a device identifier of a specific wireless pointer device in the wireless pointer devices is the same as a predetermined device identifier, utilizing the wireless receiving device to automatically build a BLE connection to the specific wireless pointer device.

13. The method as claimed in claim 10, wherein the scanning interval is greater than the number multiplied by a duration of the connection event of each wireless pointer device plus a time period of a scanning window of the wireless receiving device.

14. The method as claimed in claim 10, further comprising:
in each scanning interval, utilizing each wireless pointer device to send corresponding connection events to the wireless receiving device in sequence; and
utilizing the wireless receiving device to wait for a time period obtained by multiplying the number with the duration of the connection event of each wireless pointer device before performing a scan operation using the scanning window to detect whether other wireless pointer devices are added to the digital-pointer interaction system.

15. The method as claimed in claim 10, wherein each wireless pointer device comprises a wireless emitter and a motion sensor, and the motion sensor detects acceleration and angular speed of each wireless pointer device, and the displacement information of each wireless pointer device comprises the acceleration and angular speed of each wireless pointer device.

16. The method as claimed in claim 10, wherein the step of utilizing the host to control movement of each pointer cursor according to the displacement information of each wireless pointer device comprises:
utilizing the host to calculate displacement of each pointer cursor according to the acceleration and angular speed in the displacement information of each wireless pointer device, and to control movement of each pointer cursor according to the displacement of each pointer cursor.

17. The method as claimed in claim 10, wherein each pointer cursor is different from a cursor of an operating system executed by the host.

18. The method as claimed in claim 10, wherein one of the pointer cursors is a cursor of an operating system executed by the host, and other pointer cursors are different than the cursor of the operating system.

* * * * *